United States Patent
Boersma et al.

(10) Patent No.: US 10,671,399 B2
(45) Date of Patent: *Jun. 2, 2020

(54) LOW-OVERHEAD, LOW-LATENCY OPERAND DEPENDENCY TRACKING FOR INSTRUCTIONS OPERATING ON REGISTER PAIRS IN A PROCESSOR CORE

(71) Applicant: INTERNATIONAL BUSINESS MACHINES CORPORATION, Armonk, NY (US)

(72) Inventors: Maarten J. Boersma, Holzgerlingen (DE); Sundeep Chadha, Austin, TX (US); Kurt A. Feiste, Austin, TX (US); Michael J. Genden, Austin, TX (US); Michael K. Kroener, Ehningen (DE); David R. Terry, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,032

(22) Filed: Oct. 27, 2017

(65) Prior Publication Data
US 2019/0042268 A1 Feb. 7, 2019

Related U.S. Application Data

(63) Continuation of application No. 15/666,822, filed on Aug. 2, 2017.

(51) Int. Cl.
*G06F 9/38* (2018.01)
*G06F 9/30* (2018.01)

(52) U.S. Cl.
CPC .......... *G06F 9/3838* (2013.01); *G06F 9/3009* (2013.01); *G06F 9/30032* (2013.01); *G06F 9/30087* (2013.01); *G06F 9/30105* (2013.01)

(58) Field of Classification Search
CPC .. G06F 9/3836; G06F 9/30043; G06F 9/3838; G06F 9/384; G06F 9/3855; G06F 9/3802; G06F 9/3824; G06F 9/30032; G06F 9/30181; G06F 9/30; G06F 9/3885
See application file for complete search history.

(56) References Cited

U.S. PATENT DOCUMENTS

| | | | | |
|---|---|---|---|---|
| 5,557,761 A | * | 9/1996 | Chan ...................... | G06F 8/445 717/144 |
| 7,340,590 B1 | | 3/2008 | Sugumar et al. | |
| 2002/0124158 A1 | * | 9/2002 | Samra ................. | G06F 9/30003 712/226 |

(Continued)

OTHER PUBLICATIONS

Jason Robert Carey Patterson, Basic Instruction Scheduling (and Software Pipelining), Sep. 2003, (Year: 2003).*

(Continued)

*Primary Examiner* — Michael J Metzger
(74) *Attorney, Agent, or Firm* — Tutunjian & Bitetto, P.C.; Bryan Bortnick

(57) ABSTRACT

A computer processing system is provided. The computer processing system includes a processor configured to insert a move instruction in an instruction scheduling dependency graph generated for operands of the instruction operating on register pairs to ensure operand readiness for all of the operands used by the instruction operating on register pairs.

8 Claims, 7 Drawing Sheets

(56) References Cited

U.S. PATENT DOCUMENTS

| | | | | |
|---|---|---|---|---|
| 2004/0068331 A1* | 4/2004 | Cronquist | ........... | G06F 17/5045 |
| | | | | 700/18 |
| 2004/0088526 A1* | 5/2004 | Colavin | ............. | G06F 9/30043 |
| | | | | 712/226 |
| 2005/0039167 A1* | 2/2005 | Fernandes | ............. | G06F 8/4441 |
| | | | | 717/116 |
| 2009/0288063 A1* | 11/2009 | Rangan | ................. | G06F 8/4451 |
| | | | | 717/106 |
| 2010/0274992 A1* | 10/2010 | Chou | ................. | G06F 9/30032 |
| | | | | 712/216 |
| 2011/0047359 A1* | 2/2011 | Eichenberger | .......... | G06F 8/451 |
| | | | | 712/222 |
| 2014/0281391 A1* | 9/2014 | Dieffenderfer | ...... | G06F 9/30032 |
| | | | | 712/208 |
| 2016/0246598 A1 | 8/2016 | Kenney et al. | | |
| 2017/0315814 A1* | 11/2017 | Smith | ................... | G06F 9/3017 |
| 2018/0113713 A1* | 4/2018 | Cheng | ....................... | G06F 8/41 |

OTHER PUBLICATIONS

Mark Edward Heffernan, Data-dependency Graph Transformations for Instruction Scheduling, 2007 (Year: 2007).*
Wikipedia, Instruction Set Architecture, Jul. 2017 (Year: 2017).*
Eisen et al., "IBM Power6 Accelerators: VMX and DFU", IBM J. RES. & DEV., Nov. 2007, pp. 1-21, vol. 51 No. 6.
List of IBM Patents or Patent Applications Treated as Related dated Oct. 27, 2017, 2 pages.

* cited by examiner

LOW-OVERHEAD, LOW-LATENCY OPERAND DEPENDENCY TRACKING FOR INSTRUCTIONS OPERATING ON REGISTER PAIRS IN A PROCESSOR CORE

BACKGROUND

Technical Field

The present invention relates generally to information processing and, in particular, to low-overhead, low-latency operand dependency tracking for instructions operating on register pairs in a processor core.

Description of the Related Art

Categories of 128*b* instructions are architected to operate on register pairs, as opposed to wide 128*b* vector registers. An example is the DFP quad instruction set in the POWER Instruction Set Architecture (ISA). That means that a two-input instruction of this kind actually depends on four source registers. Natively, modern out-of-order microprocessor implementations only support tracking of three source registers per instruction. For correct execution of two-operand quad instruction, a way to deal with the dependencies is needed.

As an example, the following POWER instruction actually means the instruction set forth thereafter on the next line, effectively having two target registers f12 and f13 (instead of just f12) as well as four source registers f4, f5, f8 and f9 (instead of just f4 and f8). The vertical bar denotes concatenation.

| daddq f12, | f4, | f8 |
| daddq f12\|f13, | f4\|f5, | f8\|f9 |

An instruction operating on register pairs can be cracked into multiple internal instructions, where one internal instruction (instr1) produces part 1 of the result pair and another internal instruction (instr2) produces part 2 of the result pair. However, a problem exists in that without hooks, instr1 and instr2 look independent to the issue logic. Hence, if the sources are available in different cycles, they would issue in different cycles. However, for correct instruction execution the internal instructions instr1 and isntr2 need to be issued in synchronization. That is, it has to be made sure that whenever the operands to internal instruction instr1 are available, the operands to internal instruction instr2 are available as well, and vice versa.

Thus, there is a need for a low-overhead, low-latency operand dependency tracking for instructions operating on register pairs in a processor core.

SUMMARY

According to an aspect of the present invention, a computer processing system is provided. The computer processing system includes a processor configured to insert a move instruction in an instruction scheduling dependency graph generated for operands of the instruction operating on register pairs to ensure operand readiness for all of the operands used by the instruction operating on register pairs.

According to another aspect of the present invention, a computer-implemented method is provided for executing an instruction operating on register pairs. The method includes inserting, by a processor, a move instruction in an instruction scheduling dependency graph generated for operands of the instruction operating on register pairs to ensure operand readiness for all of the operands used by the instruction operating on register pairs.

According to yet another aspect of the present invention, a computer program product is provided for executing an instruction operating on register pairs. The computer program product includes a computer readable storage medium having program instructions embodied therewith. The program instructions are executable by a computer to cause the computer to perform a method. The method includes inserting, by a processor, a move instruction in an instruction scheduling dependency graph generated for operands of the instruction operating on register pairs to ensure operand readiness for all of the operands used by the instruction operating on register pairs.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to low-overhead, low-latency operand dependency tracking for instructions operating on register pairs in a processor core. It is to be appreciated that while one or more embodiments are described with respect to a particular processor core, the present invention can be readily applied to other similarly designed processor cores, as readily appreciated by one of ordinary skill in the art given the teachings of the present invention provided herein, while maintaining the spirit of the present invention.

In an embodiment, the required dependencies are setup by inserting a move-to-self instruction. In this way, there is no need for implementing a scratch register to keep an intermediate result (thus providing an area advantage), nor for a subsequent copy instruction (thus providing a latency advantage).

Figure 1:
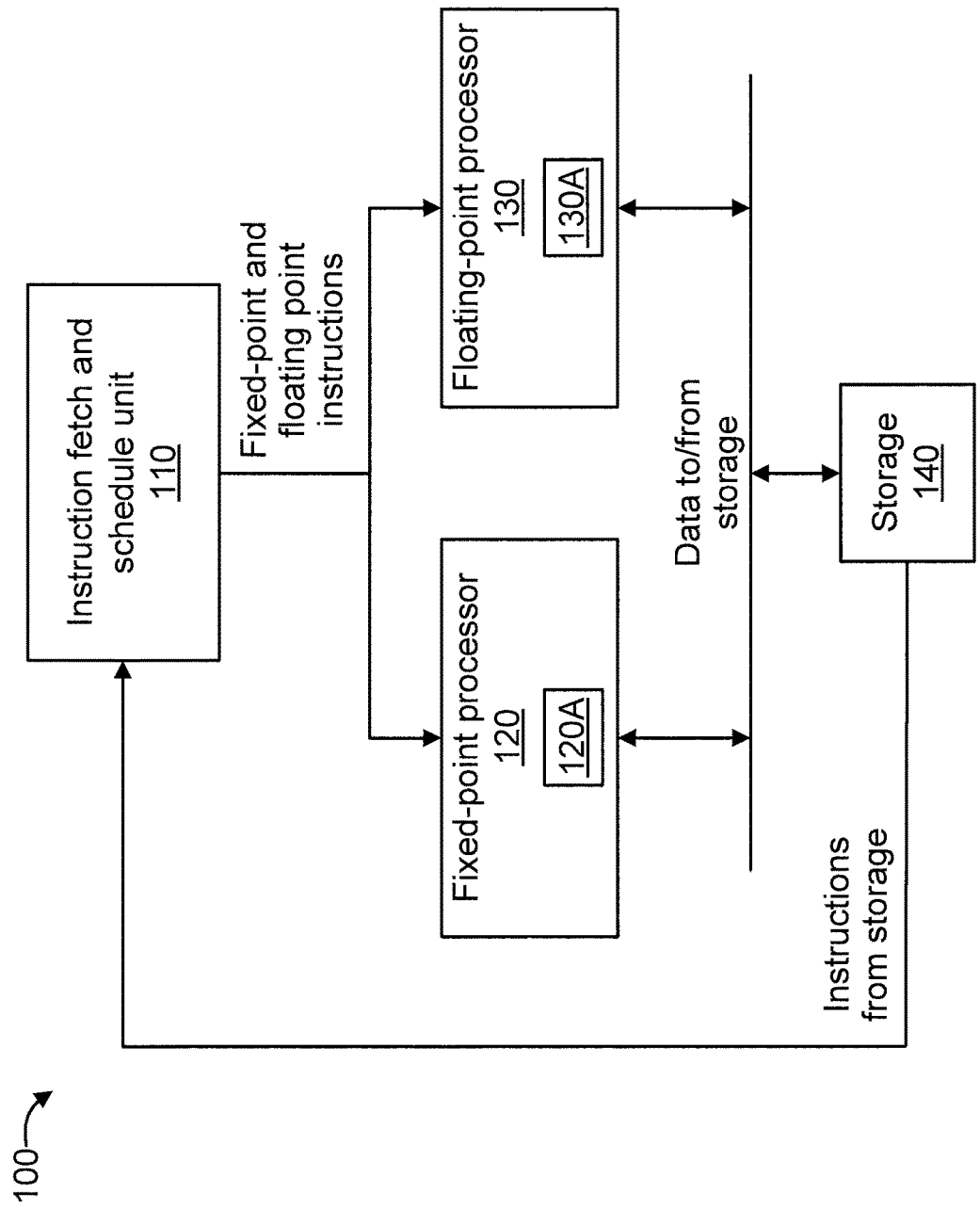
FIG. 1 shows an exemplary processor to which the present invention can be applied, in accordance with an embodiment of the present invention.

FIG. 1 shows an exemplary processor 100 to which the present invention can be applied, in accordance with an embodiment of the present invention.

The processor 100 include instruction fetch and schedule unit 110, a fixed-point processor 120, a floating-point processor 130, and a storage element 140. The fixed-point processor 120 includes a set of registers 120A. The floating-point processor 130 includes a set of registers 130A. The particular registers included in the fixed-point and floating-point processors 120, and 130, respectively, will depend on the particular processor used as readily appreciated by one of ordinary skill in the art.

The processor 110 can process, for example, branch instructions, fixed-point instructions, and floating-point instructions. From a logical perspective, processing begins at the tip with fetching, then scheduling instructions to either fixed-point or floating-point processing. These processes send and receive data from the storage element 140. The storage element 140 will send more instructions to the instruction fetch and schedule unit 110.

In an embodiment, processor 100 is a multi-core processor configured to perform simultaneous multithreading. In an embodiment, processor 100 is a multi-core superscalar symmetric processor.

Processor 100 is shown and described for the sake of illustration. However, it is to be appreciated other processor and processor configurations can also be used in accordance with the teachings of the present invention, while maintaining the spirit of the present invention.

Regarding a Decimal Floating Point (DFP) instruction, when a 128-bit operand is used, it is held in a Floating Point Register (FPR) pair and the instruction mnemonic uses a letter "q" to mean the quad-precision operation. A two-input Decimal Floating point (DFP) quad instruction depends on 2×2=4 input Floating Point Registers (FPRs). Each FPR is 64-bits wide. Operating on pairs of 64b registers is a common approach of executing 128-bit instructions without 128-bit registers.

Processor 100 is primarily designed towards efficient execution of instructions with up to 3 (not 4) source registers, because instructions operating on register pairs are relatively uncommon. A straightforward solution is to enhance the instruction schedule unit included in 110 to deal with up to 4 source registers per instruction. However, this is considered a bad trade-off as it would significantly increase the required chip area and power consumption for the instruction schedule unit 110, at no reasonable performance gain, as only infrequent instructions would benefit. Therefore, there is a need for tracking 4 source registers instead of 3, without imposing high overhead on the instruction schedule unit.

Processor 100 could first write the result of an instruction operating on register pairs into a 128b wide register, and then execute one or more subsequent internal instructions to bring the result into the result registers. However, the subsequent internal instruction imposes additional latency. Also in some implementations, the 128b wide register needs to be implemented as additional scratch register, which costs chip area. Therefore, there is a need for an executing scheme for instructions operating on register pairs that neither require a subsequent internal instruction nor an additional scratch register.

Waiting for any arbitrary number of source registers can be achieved by holding off execution of an instruction until all older instructions finished. However, if the instructions operating on register pairs would use this mechanism, the effective latency of these instructions would significantly increase, which is bad for performance. Therefore, there is a need for tracking 4 source registers instead of 3, while still keeping the instruction latency low.

Figure 2:
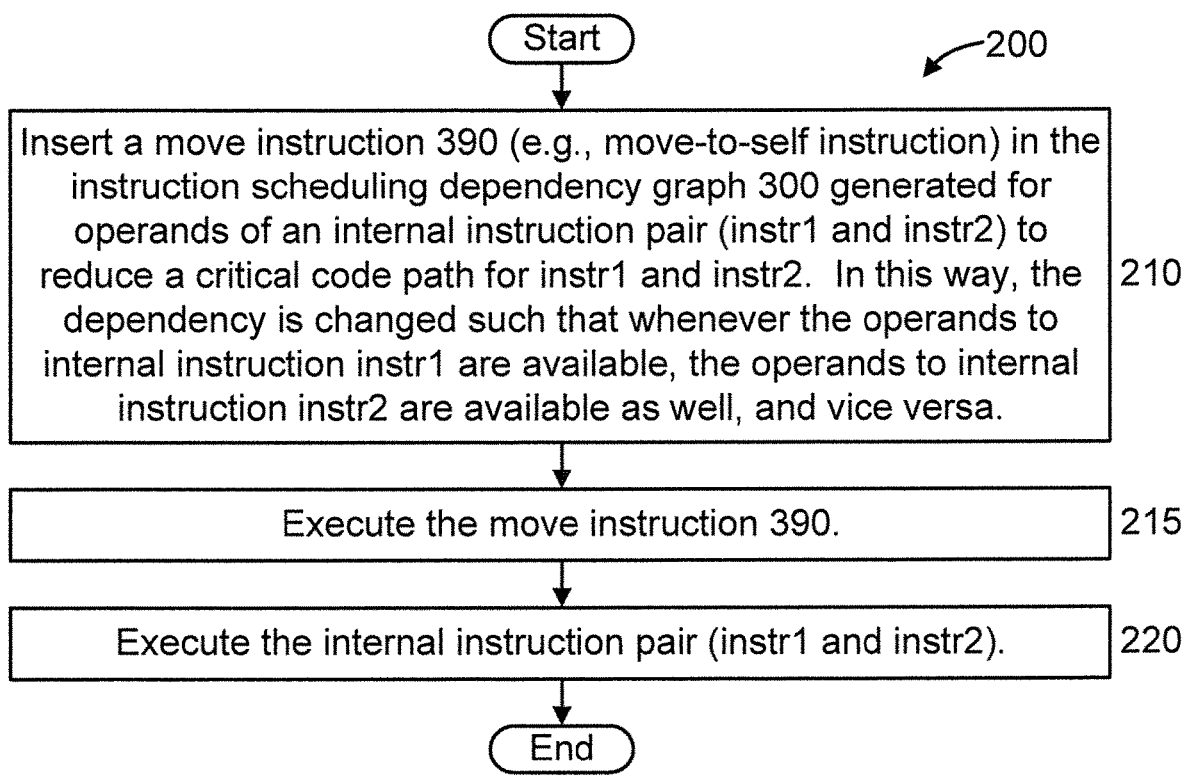
FIG. 2 shows an exemplary method for low-overhead, low-latency operand dependency tracking for instructions operating on register pairs in a processor core, in accordance with an embodiment of the present invention.

FIG. 2 shows an exemplary method 200 for low-overhead, low-latency operand dependency tracking for instructions operating on register pairs in a processor core, in accordance with an embodiment of the present invention.

At step 210, insert a move instruction 390 (e.g., move-to-self instruction) in the instruction scheduling dependency graph 300 generated for operands of an internal instruction pair (instr1 and instr2) to reduce a critical code path for instr1 and instr2. In this way, the dependency is changed such that whenever the operands to internal instruction instr1 are available, the operands to internal instruction instr2 are available as well, and vice versa.

At step 215, execute the move instruction 390.

At step 220, execute the internal instruction pair (instr1 and instr2).

It is to be appreciated that step 210 provides at the least the following two features. The first feature is the lack of need for a scratch register, thus resulting in an area reduction in Architected Register File over conventional approaches. The second feature is that there is no subsequent copy instruction needed, thus resulting in improved latency over conventional approaches.

Figure 3:
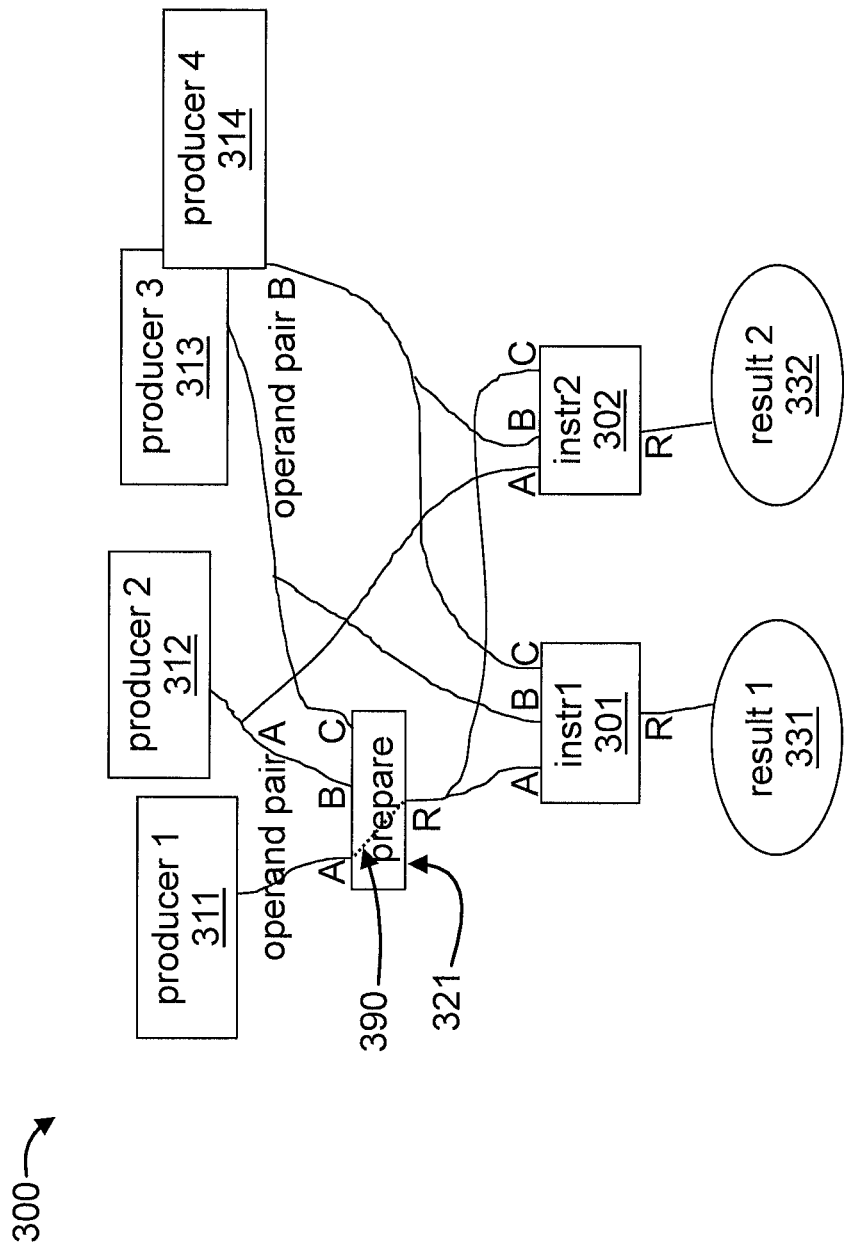
FIG. 3 shows an exemplary execution scheme as a dependency graph for an instruction operating on register pairs to which the present invention can be applied, in accordance with an embodiment of the present invention.

FIG. 3 shows an exemplary dependency graph 300 for an instruction operating on two register pairs to which the present invention can be applied, in accordance with an embodiment of the present invention.

The dependency graph 300 shows the internal execution scheme for an instruction operating on two register pairs that includes a first internal instruction instr1 301 and a second internal instruction instr2 302. The dependency graph 300 further involves a first producer (producer 1) 311, a second producer (producer 2) 312, a third producer (producer 3) 313, and a fourth producer (producer 4) 314. The respective outputs from producer 1 311 and producer 2 312 form an operand pair A. The respective outputs from producer 3 313 and producer 4 314 form an operand pair B. The dependency graph 300 additionally involves a prepare instruction 321, a first result (result 1) 331 (corresponding to internal instruction instr1), and a second result (result 2) 332 (corresponding to internal instruction instr2). The prepare instruction 321 is implemented as "move" instruction 390.

The result of the prepare instruction 321 is equivalent to input A. Nevertheless, the prepare instruction 321 waits for input B and C. The longest path from any producer to any result is two instructions.

It is to be appreciated that instr1 301 and instr2 302 are guaranteed to have their respective input source registers become available simultaneously.

Figure 4:
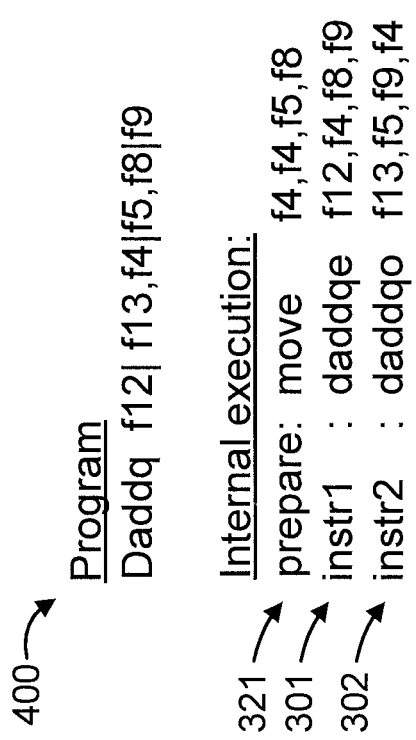
FIG. 4 shows an exemplary program instruction and its corresponding internal instructions corresponding to the execution scheme of FIG. 3, in accordance with an embodiment of the present invention.

FIG. 4 shows an exemplary program instruction 400 and how it is executed by internal instructions 301, 302, and 321 corresponding to the dependency graph 300 of FIG. 3, in accordance with an embodiment of the present invention.

The internal instructions 301, 302, and 321 include the following: instr1 301; instr2 302; and a prepare instruction 321. The prepare instruction 321 involves the following:

move f4,f4,f5,f8. The instr1 301 involves the following: daddqe f12,f4,f8,f9. The instr2 302 involves the following: daddqo f13,f5,f9,f4.

While method 300 is quite advantageous over the prior art, for example, as evident from the first feature and the second feature mentioned above, method 300 can suffer from false dependency for downstream instructions that also consume operand A. These downstream instructions unnecessarily wait for the result of the prepare instruction 321. The execution of a second prepare instruction can solve the preceding issue. Hence, the execution of the second prepare instruction can be considered a tradeoff, wherein such execution pays in bandwidth to fix false dependencies.

Figure 5:
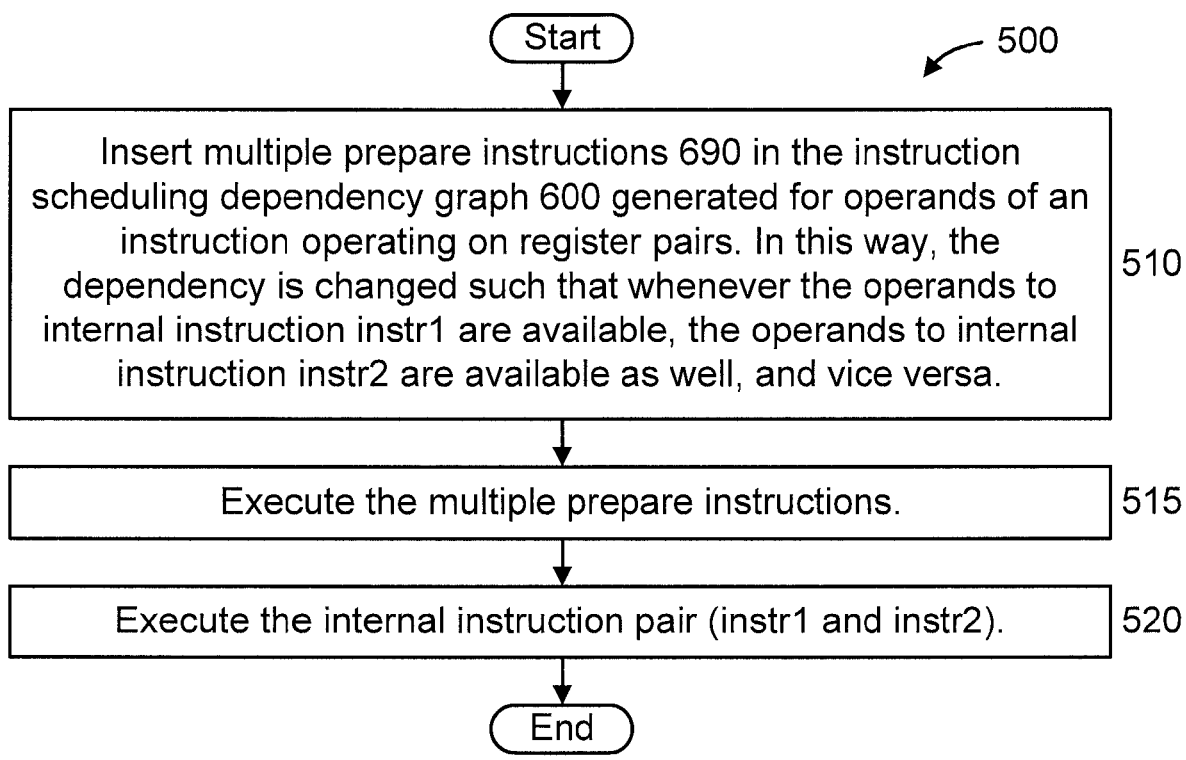
FIG. 5 shows another exemplary method for low-overhead, low-latency operand dependency tracking for instructions operating on register pairs in a processor core, in accordance with an embodiment of the present invention.

FIG. 5 shows another exemplary method 500 for low-overhead, low-latency operand dependency tracking for instructions operating on register pairs in a processor core, in accordance with an embodiment of the present invention.

At step 510, insert multiple prepare instructions 690 in the instruction scheduling dependency graph 600 generated for operands of an instruction operating on register pairs. In this way, the dependency is changed such that whenever the operands to internal instruction instr1 are available, the operands to internal instruction instr2 are available as well, and vice versa.

At step 515, execute the multiple prepare instructions.

At step 520, execute the internal instruction pair (instr1 and instr2).

In an embodiment, the prepare instructions in step 515 feed through the old value of the target registers through the prepare instructions.

In another embodiment, the prepare instructions in step 515 target a non-implemented register or do not target any register at all.

Figure 6:
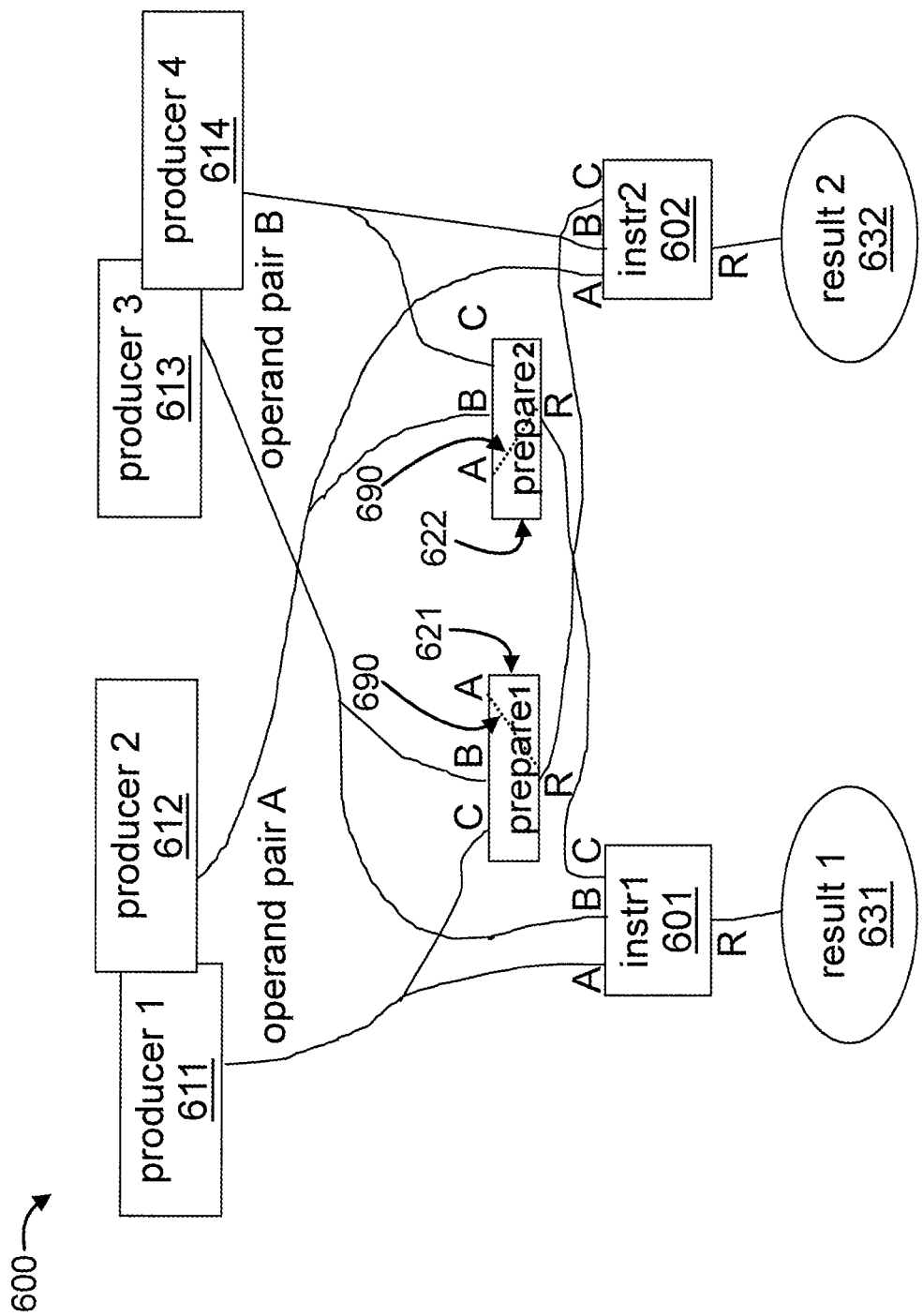
FIG. 6 shows an exemplary execution scheme as a dependency graph for an instruction operating on register pairs to which the present invention can be applied, in accordance with an embodiment of the present invention.

FIG. 6 shows an internal execution scheme with dependency graph 600 for an instruction operating on register pairs to which the present invention can be applied, in accordance with an embodiment of the present invention.

The execution scheme with dependency graph 600 involves breaking down an instruction operating on register pairs into a first internal instruction instr1 601 and a second internal instruction instr2 602. The dependency graph 600 further involves a first producer (producer 1) 611, a second producer (producer 2) 612, a third producer (producer 3) 613, and a fourth producer (producer 4) 614. The respective outputs from producer 1 611 and producer 2 612 form an operand pair A. The respective outputs from producer 3 613 and producer 4 614 form an operand pair B. The dependency graph 600 additionally involves a first prepare internal instruction (prepare1) 621, a second prepare internal instruction (prepare2) 622, a first result (result 1) 631 (corresponding to internal instruction instr1), and a second result (result 2) 632 (corresponding to internal instruction instr2).

Figure 7:
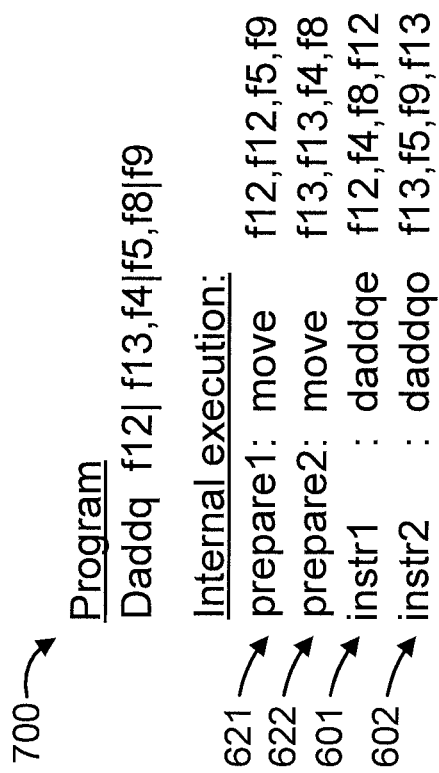
FIG. 7 shows an exemplary program instruction and its corresponding internal instructions corresponding to the execution scheme of FIG. 6, in accordance with an embodiment of the present invention.

FIG. 7 shows an exemplary program instruction 700 and how it is executed by internal instructions 601, 602, 621, and 622 corresponding to the dependency graph 600 of FIG. 6, in accordance with an embodiment of the present invention.

The internal instructions 601, 602, 621, and 622 include the following: instr1 601; instr2 602; prepare1 621; and prepare2 622.

The result of each of the prepare instructions 621 and 622 is arbitrary. In one embodiment, the prepare instruction can use the result register as target. In another embodiment, the prepare instruction does not write a target but only holds off execution of dependent internal instructions instr1 and instr2.

It is to be appreciated that instr1 601 and instr2 602 are guaranteed to have their respective input source registers become available simultaneously.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for executing an instruction operating on register pairs, comprising:
inserting, by a processor, a move-to-self instruction in an instruction scheduling dependency graph generated for operands of the instruction operating on register pairs wherein the register pairs are specified by the instruction, to ensure operand execution readiness for all of the operands used by the instruction operating on register pairs; and
executing, by the processor, the move-to-self instruction.

2. The computer-implemented method of claim 1, wherein said inserting step changes the dependency graph to ensure that a first internal instruction and a second internal instruction of the instruction are issued in synchronization.

3. The computer-implemented method of claim 1, wherein the instruction operating on register pairs is executed without use of a scratch register.

4. The computer-implemented method of claim 1, wherein the instruction operating on register pairs is executed without use of a subsequent internal instruction that copies a first half of a 128-bit result.

5. The computer-implemented method of claim 1, wherein processing of the dependency graph for the instruction operating on register pairs involves execution of a prepare internal instruction, and the method further comprises executing an additional prepare internal instruction during processing of the dependency graph to fix false dependencies for downstream instructions with respect to the instruction operating on register pairs.

6. The computer-implemented method of claim 5, wherein previous values of target registers are fed through the prepare internal instruction and the additional prepare internal instruction.

7. The computer-implemented method of claim 5, wherein the prepare internal instruction and the additional prepare internal instruction selectively (i) write to a non-implemented register, or (ii) do not write to any register at all.

8. The computer-implemented method of claim 1, wherein an insertion of the move-to-self instruction in the instruction scheduling dependency graph reduces a critical code path to obtain respective results for a first internal instruction and a second internal instruction of the instruction operating on register pairs.

* * * * *